United States Patent
Yi

(10) Patent No.: US 10,313,986 B2
(45) Date of Patent: Jun. 4, 2019

(54) METHOD AND APPARATUS FOR CONTROLLING UPLINK POWER IN WIRELESS

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/111,793

(22) PCT Filed: Jan. 15, 2015

(86) PCT No.: PCT/KR2015/000455
§ 371 (c)(1),
(2) Date: Jul. 14, 2016

(87) PCT Pub. No.: WO2015/108359
PCT Pub. Date: Jul. 23, 2015

(65) Prior Publication Data
US 2016/0337987 A1    Nov. 17, 2016

Related U.S. Application Data

(60) Provisional application No. 62/061,703, filed on Oct. 9, 2014, provisional application No. 62/034,153, filed (Continued)

(51) Int. Cl.
*H04W 52/14* (2009.01)
*H04W 52/16* (2009.01)
(Continued)

(52) U.S. Cl.
CPC ......... *H04W 52/325* (2013.01); *H04L 5/0051* (2013.01); *H04W 52/146* (2013.01);
(Continued)

(58) Field of Classification Search
CPC . H04W 52/00; H04W 52/0209; H04W 52/14; H04W 52/16; H04W 52/32;
(Continued)

(56) References Cited

U.S. PATENT DOCUMENTS 8,917,668 B1 * 12/2014 Song ................ H04W 36/0072
370/328
2007/0177501 A1 * 8/2007 Papasakellariou .... H04W 24/00
370/229
(Continued)

FOREIGN PATENT DOCUMENTS

| CN | 103119989 | 5/2013 |
|----|-----------|--------|
| KR | 1020110133448 A | 12/2011 |
| WO | 2010124241 | 10/2010 |

OTHER PUBLICATIONS

Panasonic, "Uplink transmission power management and PHR reporting for dual connectivity", 3GPP TSG RAN WG2 Meeting #84, R2-133945, Nov. 1, 2013, 4 pages.
(Continued)

*Primary Examiner* — Jeffrey M Rutkowski
*Assistant Examiner* — Jonathan Wood
(74) *Attorney, Agent, or Firm* — Lee Hong Degerman Kang Waimey

(57) ABSTRACT

Descriptions on the method and the apparatus for controlling uplink transmission power are provided. The method for controlling uplink transmission power comprises receiving a signal on a downlink channel in dual connectivity with master eNB (MeNB) and secondary eNB (SeNB), allocating transmission power for sounding reference signals (SRS) and transmitting SRS to the MeNB and SeNB based on the allocated transmission power. Transmission power may be allocated differently depending on whether the MeNB and the SeNB are synchronous or not.

10 Claims, 14 Drawing Sheets

Related U.S. Application Data on Aug. 7, 2014, provisional application No. 61/927,503, filed on Jan. 15, 2014.

(51) Int. Cl.
    *H04W 52/32* (2009.01)
    *H04W 52/34* (2009.01)
    *H04W 72/04* (2009.01)
    *H04L 5/00* (2006.01)

(52) U.S. Cl.
    CPC ........... *H04W 52/16* (2013.01); *H04W 52/34* (2013.01); *H04W 72/0473* (2013.01)

(58) Field of Classification Search
    CPC . H04W 52/34; H04W 52/146; H04W 52/325; H04W 5/00; H04W 5/0051; H04W 72/04; H04W 72/0473; H04W 40/24; H04W 88/02
    See application file for complete search history.

(56) References Cited

U.S. PATENT DOCUMENTS

| | | | |
|---|---|---|---|
| 2009/0316611 A1* | 12/2009 | Stratford | H04J 3/0608 370/294 |
| 2010/0113105 A1* | 5/2010 | Xu | H04W 52/08 455/572 |
| 2011/0176440 A1* | 7/2011 | Frank | G01S 5/0215 370/252 |
| 2011/0243066 A1* | 10/2011 | Nayeb Nazar | H04L 1/007 370/328 |
| 2012/0057547 A1* | 3/2012 | Lohr | H04L 5/0007 370/329 |
| 2012/0155337 A1* | 6/2012 | Park | H04L 1/1692 370/280 |
| 2012/0178482 A1* | 7/2012 | Seo | H04W 56/00 455/501 |
| 2012/0327866 A1* | 12/2012 | Krishnamurthy | H04W 52/10 370/329 |
| 2013/0010706 A1* | 1/2013 | Kela | H04W 52/146 370/329 |
| 2013/0039305 A1* | 2/2013 | Kishiyama | H04W 72/1263 370/329 |
| 2013/0039316 A1* | 2/2013 | Kwon | H04J 11/0023 370/329 |
| 2013/0044621 A1* | 2/2013 | Jung | H04W 72/082 370/252 |
| 2013/0114562 A1* | 5/2013 | Seo | H04W 52/146 370/329 |
| 2013/0195084 A1* | 8/2013 | Chen | H04W 72/0413 370/336 |
| 2013/0250875 A1* | 9/2013 | Chen | H04W 52/365 370/329 |
| 2013/0322392 A1* | 12/2013 | Abe | H04L 5/00 370/329 |
| 2014/0056278 A1* | 2/2014 | Marinier | H04W 72/044 370/330 |
| 2014/0056395 A1* | 2/2014 | Alriksson | H03G 3/3073 375/345 |
| 2014/0233438 A1* | 8/2014 | Rao | H04W 16/14 370/280 |
| 2015/0036666 A1* | 2/2015 | Blankenship | H04W 56/0045 370/336 |
| 2015/0124743 A1* | 5/2015 | Damnjanovic | H04W 76/025 370/329 |
| 2015/0189574 A1* | 7/2015 | Ng | H04W 24/08 370/252 |
| 2015/0201383 A1* | 7/2015 | Papasakellariou | H04W 52/367 370/278 |
| 2016/0242128 A1* | 8/2016 | Loehr | H04W 52/365 |

OTHER PUBLICATIONS

LG Electronics Inc., "Management of UE Transmit Power in Dual Connectivity", 3GPP TSG-RAN WG2 Meeting #84, R2-134048, Nov. 1, 2013, 3 pages.

Renesas Mobile Europe, "UL transmission of dual connectivity", 3GPP TSG-RAN WG2 Meeting #82, R2-131849, May 11, 2013, 5 pages.

The State Intellectual Property Office of the People's Republic of China Application Serial No. 201580004852.0, Office Action dated Oct. 8, 2018, 6 pages.

European Patent Office Application Serial No. 15737913.2, Search Report dated Jul. 24, 2017, 8 pages.

European Patent Office Application Serial No. 15737913.2, Office Action dated Jun. 19, 2018, 9 pages.

Pantech, "Simultaneous transmission in multiple TA", 3GPP TSG RAN WG1 Meeting #68, R1-120318, Feb. 2012, 3 pages.

LG Electronics, "Management of UE Transmit Power in Dual Connectivity", 3GPP TSG RAN WG2 Meeting #83, R2-132582, Aug. 2013, 2 pages.

NTT Docomo, "SRS handling and its power-control", 3GPP TSG RAN WG1 Meeting #78bis, R1-144143, Oct. 2014, 4 pages.

\* cited by examiner

METHOD AND APPARATUS FOR CONTROLLING UPLINK POWER IN WIRELESS

CROSS-REFERENCE TO RELATED APPLICATIONS

This application is the National Stage filing under 35 U.S.C. 371 of International Application No. PCT/KR2015/000455, filed on Jan. 15, 2015, which claims the benefit of U.S. Provisional Application Nos. 61/927,503, filed on Jan. 15, 2014, 62/034,153, filed on Aug. 7, 2014, and 62/061,703, filed on Oct. 9, 2014, the contents of which are all hereby incorporated by reference herein in their entirety.

TECHNICAL FIELD

The present invention relates to wireless communications, and more particularly, to a method and apparatus for controlling an uplink power in a wireless communication system.

BACKGROUND ART

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established here one CG can have multiple CCs. Each CC is defined by a single bandwidth and a center frequency.

In LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

Uplink power control determines the average power over a single carrier frequency division multiple access (SC-FDMA) symbol in which the physical channel is transmitted. Uplink power control controls the transmit power of the different uplink physical channels. Efficient uplink power control method for CA or dual connectivity may be required.

SUMMARY OF INVENTION

Technical Problem

The present invention provides a method and apparatus for determining transmission power allocated to transmit reference signals depending on whether MeNB and SeNB are asynchronous or synchronous.

The present invention provides a method and apparatus for allocating transmission power with priority between SRSs of MeNB and SeNB, SRS and CSI, etc.

The present invention provides a method and apparatus for allocating transmission power according to an order determined among symbols/signals to be transmitted.

Technical Solution

An embodiment of the present invention(s) is a method of controlling uplink transmission power. The method may comprise receiving a signal on a downlink channel in dual connectivity with master eNB (MeNB) and secondary eNB (SeNB), allocating transmission power for sounding reference signals (SRS) and transmitting SRS to the MeNB and SeNB based on the allocated transmission power.

Another embodiment of the present invention(s) is an apparatus of controlling uplink transmission power. The apparatus may comprise a radio frequency (RF) unit for transmitting and receiving a radio signal, wherein the radio signal includes information on transmission power which indicates a power control mode and a processor operatively coupled to the RF unit, wherein the processor is configured for transmitting signals via the RF unit based on a scheduling for UL and/or downlink (DL), wherein the RF unit may receive a signal on a downlink channel in dual connectivity with master eNB (MeNB) and secondary eNB (SeNB), and wherein the processor may allocate transmission power for sounding reference signals (SRS) and transmit SRS for the MeNB and the SeNB with the allocated transmission power via the RF unit.

Advantageous Effects

According to the present invention, the transmission power allocated to transmit reference signals can be determined efficiently depending on whether MeNB and SeNB are asynchronous or synchronous.

According to the present invention, transmission power can be allocated efficiently with priority between SRSs of MeNB and SeNB, SRS and CSI, etc.

According to the present invention, transmission power allocated according to an order determined among symbols/signals to be transmitted.

MODE FOR INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto.

Figure 1:
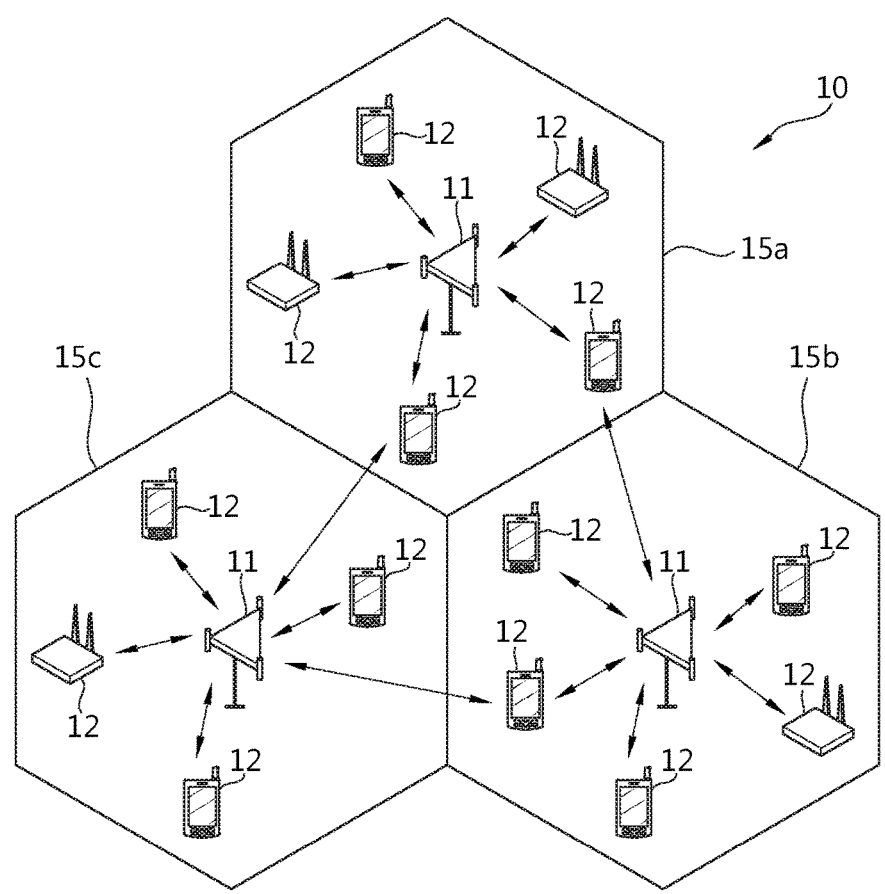
FIG. 1 shows a wireless communication system.

FIG. 1 shows a wireless communication system. The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
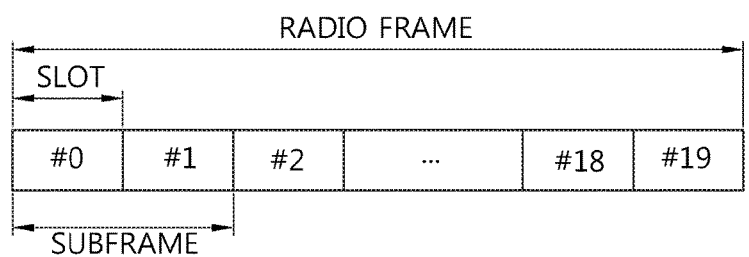
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbols may be called by other names depending on a multiple-access scheme. For example, when SC-FDMA is in use as an uplink multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Frame structure type 1 is applicable to both full duplex and half duplex FDD. Each radio frame is $T_f=307200\times T_s=10$ ms long and consists of 20 slots of length $T_{slot}=15360\times T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval. Uplink and downlink transmissions are separated in the frequency domain. In half-duplex FDD operation, the UE cannot transmit and receive at the same time while there are no such restrictions in full-duplex FDD.

Frame structure type 2 is applicable to TDD. Each radio frame of length $T_f=307200\times T_s=10$ ms consists of two half-frames of length $153600\times T_s=5$ ms each. Each half-frame consists of five subframes of length $30720\times T_s=1$ ms. The supported uplink-downlink configurations are listed in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes the subframe is reserved for downlink transmissions, "U" denotes the subframe is reserved for uplink transmissions and "S" denotes a special subframe with the three fields downlink pilot time slot (DwPTS), guard period (GP) and uplink pilot time slot (UpPTS). Each subframe i is defined as two slots, 2i and 2i+1 of length $T_{slot}=15360\times T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

In case multiple cells are aggregated, the UE may assume that the guard period of the special subframe in the different cells have an overlap of at least $1456\times T_s$. In case multiple cells with different uplink-downlink configurations are aggregated and the UE is not capable of simultaneous reception and transmission in the aggregated cells, the following constraints apply:
- if the subframe in the primary cell is a downlink subframe, the UE shall not transmit any signal or channel on a secondary cell in the same subframe
- if the subframe in the primary cell is an uplink subframe, the UE is not expected to receive any downlink transmissions on a secondary cell in the same subframe
- if the subframe in the primary cell is a special subframe and the same subframe in a secondary cell is a downlink subframe, the UE is not expected to receive physical downlink shared channel (PDSCH)/enhanced physical downlink control channel (EPDCCH)/physical multicast channel (PMCH)/positioning reference signal (PRS) transmissions in the secondary cell in the same subframe, and the UE is not expected to receive any other signals on the secondary cell in OFDM symbols that overlaps with the guard period or UpPTS in the primary cell.

Figure 3:
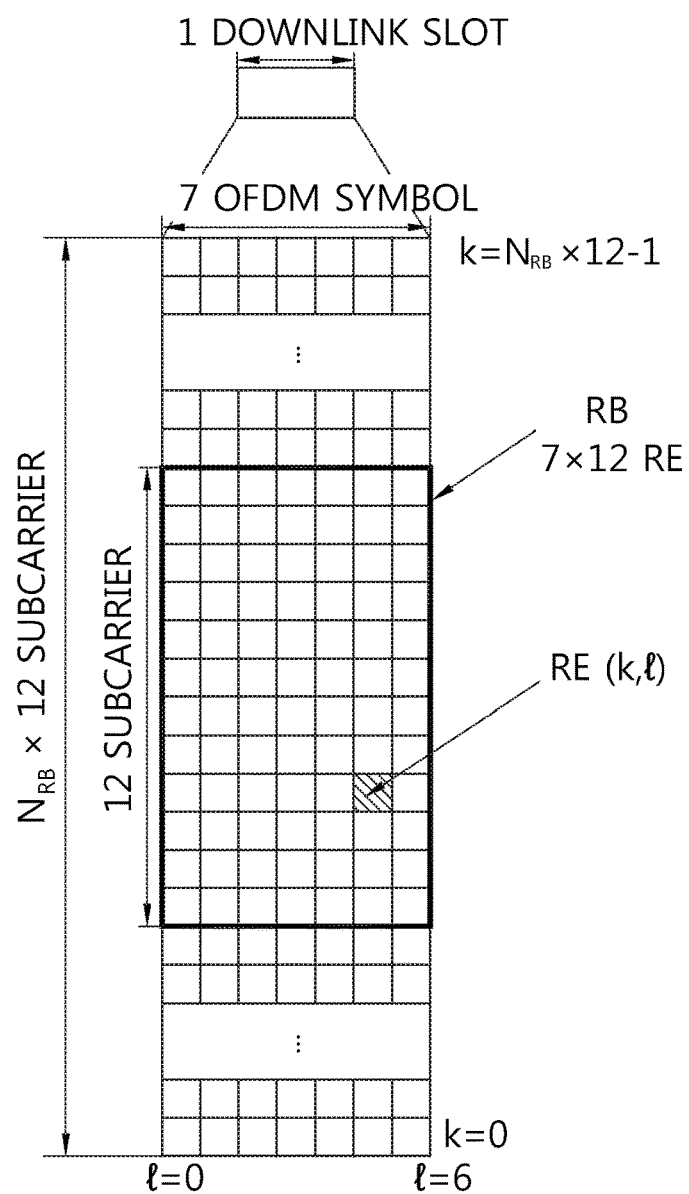
FIG. 3 shows a resource grid for one downlink slot.

FIG. 3 shows a resource grid for one downlink slot. Referring to FIG. 3, a downlink slot includes a plurality of OFDM symbols in time domain. It is described herein that one downlink slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the downlink slot depends on a downlink transmit bandwidth. The structure of an uplink slot may be same as that of the downlink slot.

The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
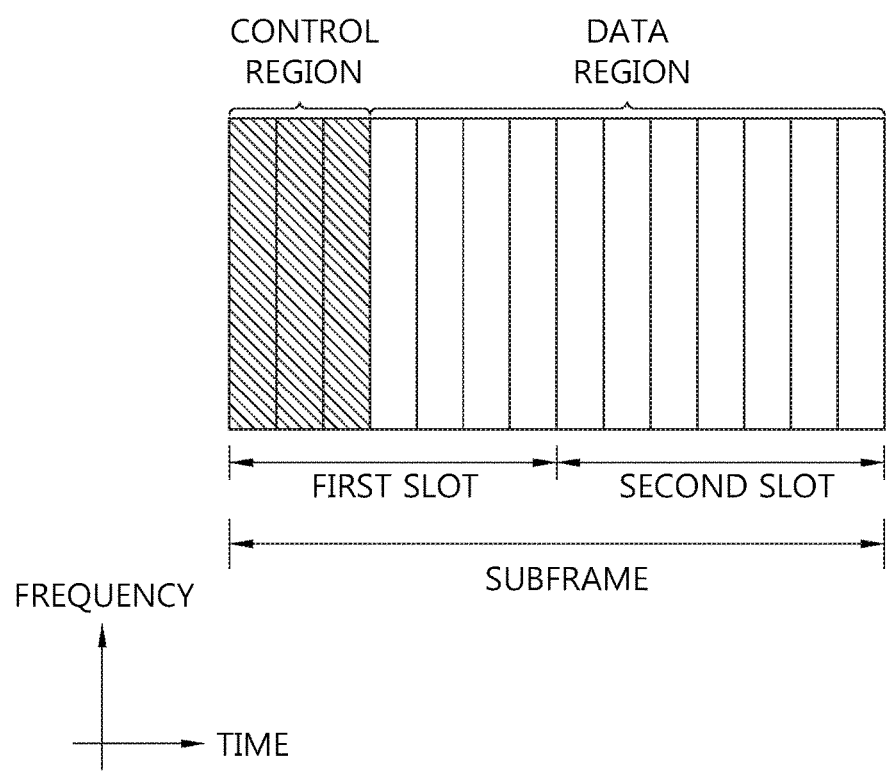
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
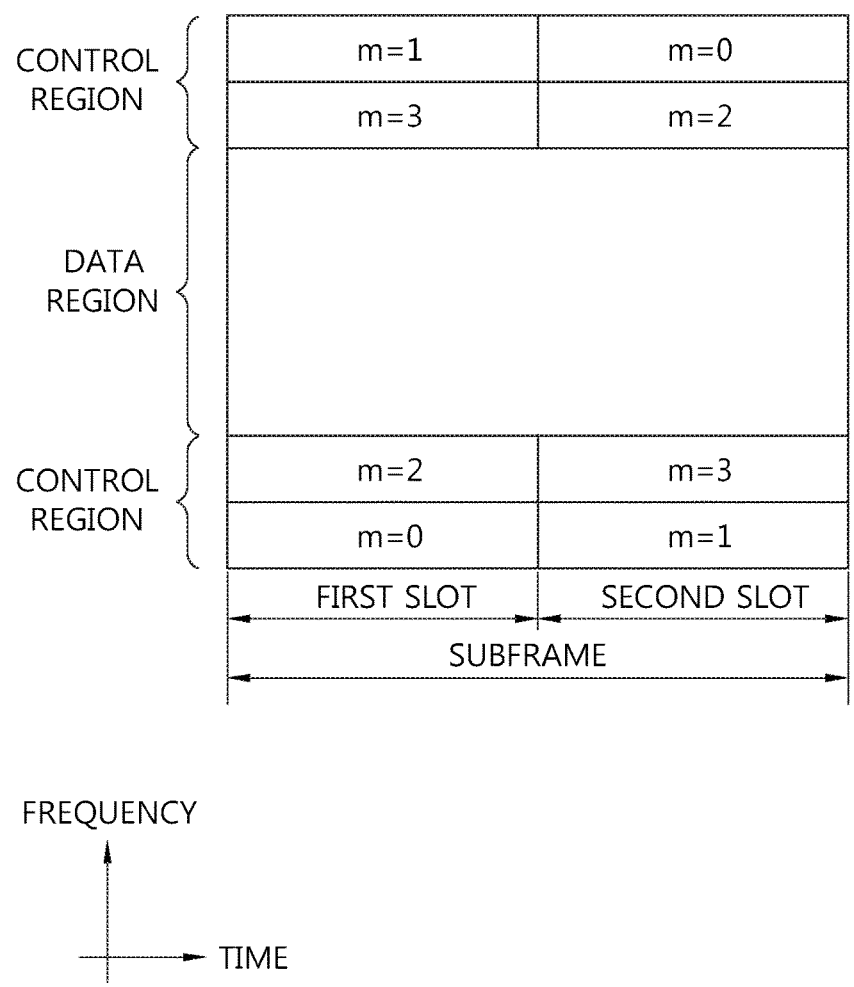
FIG. 5 shows structure of an uplink subframe.

FIG. 5 shows structure of an uplink subframe. Referring to FIG. 5, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting uplink control information through different subcarriers according to time.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information. Carrier aggregation (CA) is described. It may be referred to Section 5.5 of 3GPP TS 36.300 V11.6.0 (2013-06).

In CA, two or more component carriers (CCs) are aggregated in order to support wider transmission bandwidths up to 100 MHz or more. A UE may simultaneously receive or transmit on one or multiple CCs depending on its capabilities. A UE with single timing advance capability for CA can simultaneously receive and/or transmit on multiple CCs corresponding to multiple serving cells sharing the same timing advance (multiple serving cells grouped in one timing advance group (TAG)). A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

A serving cell is combination of downlink and optionally uplink resources. That is, a serving cell may consist of one DL CC and one UL CC. Alternatively, a serving cell may consist of one DL CC. CA may have a plurality of serving cells. The plurality of serving cells may consist of one primary serving cell (PCell) and at least one secondary serving cell (SCell). PUCCH transmission, random access procedure, etc., may be performed only in the PCell.

Figure 6:
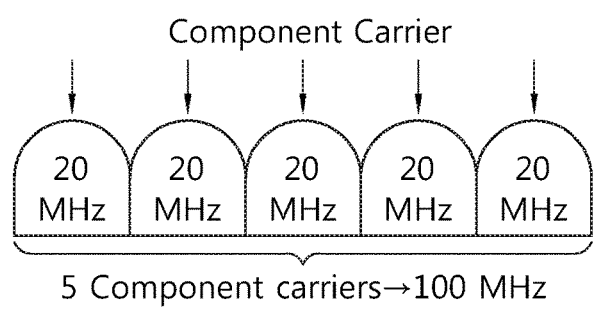
FIG. 6 shows an example of a carrier aggregation of 3GPP LTE-A.

FIG. 6 shows an example of a carrier aggregation of 3GPP LTE-A. Referring to FIG. 6, each CC has a bandwidth of 20 MHz, which is a bandwidth of 3GPP LTE. Up to 5 CCs or more may be aggregated, so maximum bandwidth of 100 MHz or more may be configured.

CA is supported for both contiguous and non-contiguous CCs with each CC limited to a maximum of 110 RBs in the frequency domain using the Rel-8/9 numerology.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. In typical TDD deployments, the number of CCs and the bandwidth of each CC in UL and DL is the same. A number of TAGs that can be configured depends on the TAG capability of the UE.

CCs originating from the same eNB need not to provide the same coverage.

CCs shall be LTE Rel-8/9 compatible. Nevertheless, existing mechanisms (e.g., barring) may be used to avoid Rel-8/9 UEs to camp on a CC.

The spacing between center frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

For TDD CA, the downlink/uplink configuration is identical across component carriers in the same band and may be the same or different across component carriers in different bands.

Dual connectivity is described.

Figure 7:
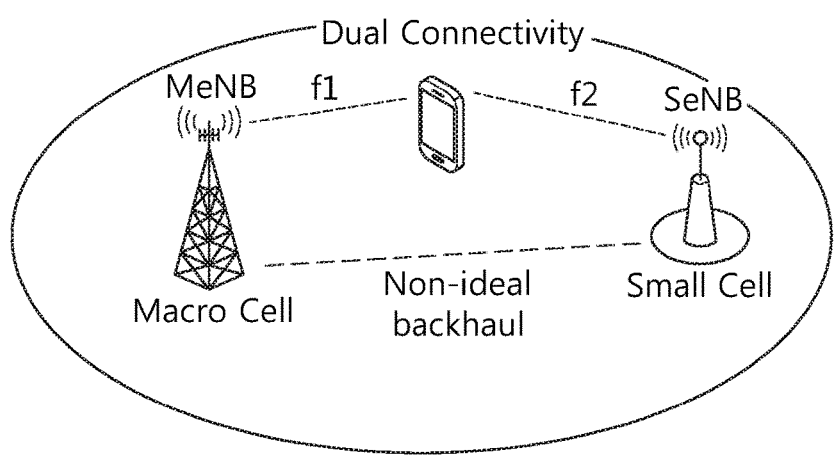
FIG. 7 shows an example of dual connectivity to a macro cell and a small cell.

FIG. 7 shows an example of dual connectivity to a macro cell and a small cell. Referring to FIG. 7, the UE is connected to both the macro cell and the small cell. A macro cell eNB serving the macro cell is the MeNB in dual connectivity, and a small cell eNB serving the small cell is the SeNB in dual connectivity. The MeNB is an eNB which terminates at least S1-MME and therefore act as mobility anchor towards the CN in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be generally configured for transmitting other types of traffic such as VoIP, streaming data, or signaling data. In the dual connectivity, the UE may configured with one carrier group per each eNB in which all the carriers are configured with one PUCCH carrier where all HARQ-ACK and feedback are transmitted from carriers configured by one eNB.

The interface between the MeNB and SeNB is called Xn interface. The Xn interface is assumed to be non-ideal, i.e., the delay in Xn interface could be up to 60 ms.

Uplink power control according to the current specification of 3GPP LTE is described. It may be referred to Section of 5.1 of 3GPP TS 36.213 V11.3.0 (2013-06). For PUSCH, the transmit power $\hat{P}_{PUSCH,c}(i)$ is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted. For PUCCH or sounding reference signal (SRS), the transmit power $\hat{P}_{PUCCH}(i)$ or $\hat{P}_{SRS,c}(i)$ is split equally across the configured antenna ports for PUCCH or SRS. $\hat{P}_{SRS,c}(i)$ is the linear value of $P_{SRS,c}(i)$.

Uplink power control for the PUSCH is described. The setting of the UE transmission power for a PUSCH transmission may be defined as follows. If the UE transmits PUSCH without a simultaneous PUCCH for the serving cell c, then the UE transmit power $P_{PUSCH,c}(i)$ for PUSCH transmission in subframe i for the serving cell c may be given by Equation 1.

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \langle \text{Equation 1} \rangle$$

If the UE transmits PUSCH simultaneous with PUCCH for the serving cell c, then the UE transmit power $P_{PUSCH,c}(i)$ for the PUSCH transmission in subframe i for the serving cell c may be given by Equation 2.

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \langle \text{Equation 2} \rangle$$

If the UE is not transmitting PUSCH for the serving cell c, for the accumulation of transmit power control (TPC) command received with DCI format 3/3A for PUSCH, the UE shall assume that the UE transmit power $P_{PUSCH,c}(i)$ for the PUSCH transmission in subframe i for the serving cell c may be computed by Equation 3.

$$P_{PUSCH,c}(i) = \min \{P_{CMAX,c}(i), P_{O\_PUSCH,c}(1) + \alpha_c(1) \cdot PL_c + f_c(i)\} [dBm] \quad \langle \text{Equation 3} \rangle$$

In equations described above, $P_{CMAX,c}(i)$ is the configured UE transmit power in subframe i for serving cell c and $\hat{P}_{CMAX,c}(i)$ is the linear value of $P_{CMAX,c}(i)$. $\hat{P}_{PUCCH}(i)$ is the linear value of $P_{PUCCH}(i)$ described below. $M_{PUSCH,c}(i)$ is the bandwidth of the PUSCH resource assignment expressed in number of resource blocks valid for subframe i and serving cell c. $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. $PL_c$ is the downlink pathloss estimate calculated in the UE for serving cell c in dB and $PL_c$=referenceSignalPower−higher layer filtered reference signal received power (RSRP), where referenceSignalPower is provided by higher layers and RSRP and the higher layer filter configuration are defined for the reference serving cell.

If serving cell c belongs to a timing advance group (TAG) containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking is used as the reference serving cell for determining referenceSignalPower and higher layer filtered RSRP. If serving cell c belongs to a TAG not containing the primary cell then serving cell c is used as the reference serving cell for determining referenceSignalPower and higher layer filtered RSRP.

If the total transmit power of the UE would exceed $\hat{P}_{CMAX}(i)$, the UE may scale $\hat{P}_{PUSCH,c}(i)$ for the serving cell c in subframe i such that Equation 4 is satisfied.

$$\sum_c w(i) \cdot \hat{P}_{PUSCH,c}(i) \leq (\hat{P}_{CMAX}(i) - \hat{P}_{PUCCH}(i)) \quad \langle \text{Equation 4} \rangle$$

In Equation 4, $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where 0≤w(i)≤1. In case there is no PUCCH transmission in subframe i, $\hat{P}_{PUCCH}(i)$=0.

If the UE has PUSCH transmission with uplink control information (UCI) on serving cell j and PUSCH without UCI in any of the remaining serving cells, and the total transmit power of the UE would exceed $\hat{P}_{CMAX}(i)$, the UE may scale $\hat{P}_{PUSCH,c}(i)$ for the serving cells without UCI in subframe i such that Equation 5 is satisfied.

$$\sum_{c \neq j} w(i) \cdot \hat{P}_{PUSCH,c}(i) \leq (\hat{P}_{CMAX}(i) - \hat{P}_{PUSCH,j}(i)) \quad \langle \text{Equation 5} \rangle$$

$\hat{P}_{PUSCH,c}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$. Note that w(i) values are the same across serving cells when w(i)>0 but for certain serving cells w(i) may be zero.

If the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE may obtain $\hat{P}_{PUSCH,c}(i)$ according to Equation 6.

$$\hat{P}_{PUSCH,j}(i) = \min(\hat{P}_{PUSCH,j}(i), (\hat{P}_{CMAX}(i) - \hat{P}_{PUCCH}(i))) \quad \langle \text{Equation 6} \rangle$$

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG, the UE shall adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG, the UE shall adjust its total transmission power to not exceed $P_{CMAX}$ on any overlapped portion.

If the UE is configured with multiple TAGs, and if the SRS transmission of the UE in a symbol on subframe i for a given serving cell in a TAG overlaps with the PUCCH/PUSCH transmission on subframe I or subframe i+1 for a different serving cell in the same or another TAG, the UE shall drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s), the UE shall drop the SRS transmissions if the total transmission power exceeds $P_{CMAX}$ on any overlapped portion of the symbol.

If the UE is configured with multiple TAGs, the UE shall, when requested by higher layers, to transmit physical random access channel (PRACH) in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

Uplink power control for the PUCCH is described. If serving cell c is the primary cell, the setting of the UE transmission power $P_{PUCCH}$ for the PUCCH transmission in subframe i may be defined by Equation 7.

$$P_{PUCCH}(i) = \min \left\{ \begin{array}{l} P_{CMAX,c}(i), \\ P_{O\_PUSCH}(j) + PL_c + h(n_{CQI}, n_{HARQ}, n_{SR}) + \\ \Delta_{F\_PUCCH}(F) + \Delta_{TxD}(F') + g(i) \end{array} \right\} [dBm] \quad \text{⟨Equation 7⟩}$$

If the UE is not transmitting PUCCH for the primary cell, for the accumulation of TPC command received with DCI format 3/3A for PUCCH, the UE shall assume that the UE transmit power $P_{PUCCH}$ for the PUCCH transmission in subframe i may be computed by Equation 8.

$$P_{PUCCH}(i) = \min \{P_{CMAX,c}(i), P_{0\_PUCCH} + PL_c + g(i)\}[dBm] \quad \text{<Equation 8>}$$

In equations described above, $P_{CMAX,c}(i)$ is the configured UE transmit power in subframe i for serving cell c. The parameter $\Delta_{F\_PUCCH}(F)$ is provided by higher layers. If the UE is configured by higher layers to transmit PUCCH on two antenna ports, the value of $\Delta_{TxD}(F')$ is provided by higher layers. Otherwise, $\Delta_{TxD}(F')=0$. $h(n_{CQI}, n_{HARQ}, n_{SR})$ is a PUCCH format dependent value, where $n_{CQI}$ corresponds to the number of information bits for the channel quality information (CQI). $n_{SR}=1$ if subframe i is configured for SR for the UE not having any associated transport block for UL-SCH, otherwise $n_{SR}=0=0$. $P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

Hereinafter, a method for controlling uplink power according to embodiments of the present invention is described. An embodiment of the present invention may propose power control aspects when inter-site carrier aggregation and PUCCH offloading is used for a UE. Inter-site carrier aggregation may be defined as that a UE is configured with multiple carriers where at least two carriers are associated with separate eNBs which may be connected by ideal backhaul or non-ideal backhaul. By the PUCCH offloading, PUCCH can be transmitted via other cell. For example, PUCCH may also be transmitted by SCell when PUCCH offloading is applied.

Meanwhile, Uplink sounding reference signals (SRS) may be used by the eNB for estimating channel state to support uplink scheduling and link adaptation. The SRS may also be used in cases that uplink transmission is needed, although there is no data to transmit such as the case UL timing needs to be aligned. Further, uplink SRS may be used for downlink channel state estimation with sufficient uplink/downlink reciprocity.

The SRS transmission power may follow transmission power of the PUSCH, compensating for the exact bandwidth of the SRS transmission and with an additional power offset.

However, the transmission power for SRS needs to be discussed and, hereinafter, method and apparatus for determining the transmission power for SRS are described.

For the power control for dual connectivity (DC), dropped SRS within a carrier group (CG) following CA rules is not considered. Two cases can be considered as power control modes for dual connectivity. One is for the case that MeNB and SeNB are synchronous, which can be called as power control mode 1 (PCM1). The other is for the case that MeNB and SeNB are asynchronous, which can be called as power control mode 2 (PCM2). DCM2 is first explained.

In DC, PCM2 (power control mode 2 or asynchronous scenario) can be applied as below (1) to (4).

(1) In sharing the remaining power across CGs without PRACH in any CG, the presence of SRS in a subframe of a CG may be not accounted for.

(2) The allocated power may apply throughout the entire subframe regardless of using shortened PUCCH/PUSCH.

(3) In case subframe i, i+1 of master carrier group (MCG) overlaps with subframe j of secondary carrier group (SCG), Maximum remaining power towards j of SCG can be obtained by equation 9.

Maximum remaining power towards $j$ of
SCG=PCmax–$P$_MeNB–Remaining power allocated to subframe$i$ of MCG         <Equation 9>

(4) At SRS transmission, additional power may be allocated by Look-ahead the next overlapped subframe (if applicable). Alternatively, additional power may not be allocated if a UE cannot perform look-ahead. If look-ahead is assumed, SRS may be depriortized over PRACH/PUCCH/PUSCH of the other CG. In other words, if there is no scheduled PRACH/PUCCH/PUSCH in the other CG or the power which will not be used by the other CG, the power may be applicable towards SRS only in SRS-transmission OFDM symbol. In addition, if look-ahead is assumed between SRSs, CG associated with earlier timing may get the remaining power.

In DC, PCM1 (power control mode 1 or synchronous scenario) can be applied as below (A) to (C).

(A) In sharing the remaining power across CGs without PRACH in any CG, the presence of SRS in a subframe of a CG is not accounted for.
(B) The allocated power may apply throughout the entire subframe regardless of using shortened PUCCH/PUSCH (thus SRS can be use that power)
(C) At SRS transmission, additional power may be allocated by Look-ahead the next overlapped subframe (if applicable) or by deprioritizing SRS over PRACH/PUCCH/PUSCH of the other CG. In other words, if there is no scheduled PRACH/PUCCH/PUSCH in the other CG or the power which will not be used by the other CG, the power may be applicable towards SRS only in SRS-transmission OFDM symbol. Further, between SRSs, MCG may get higher priority.

This implies that SRS may be deprioritized over other channels of the other CG if there is any. However, at least, the power used/allocated for non-SRS channel for the CG can be used for SRS transmission as well.

In DCM2, guaranteed power can be used for SRS, however, remaining power will not be allocated to SRS just for that unless there is no on-going/scheduled non-SRS transmission in the other CG.

Alternatively, there are multiple ways of determining power to SRS in PCM2 or asynchronous scenario as following alternatives 1 to 4.

Figure 8:
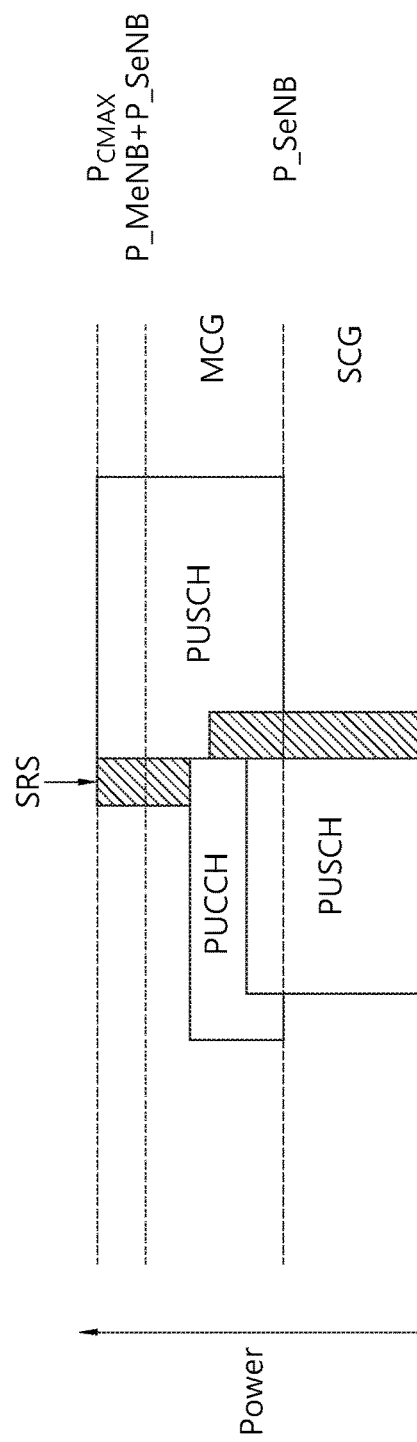
FIG. 8 briefly describes an example of asynchronous case.

FIG. 8 briefly describes an example of asynchronous case. Referring to FIG. 8, at subframe boundary, channels of MeNB and SeNB are overlapped. SRS is located at a boundary.

Allocated power for SeNB, S_MeNB, and allocated power for MeNB and SeNB, P_MeNB+S_eNB are marked in the FIG. 8.

Figure 9:
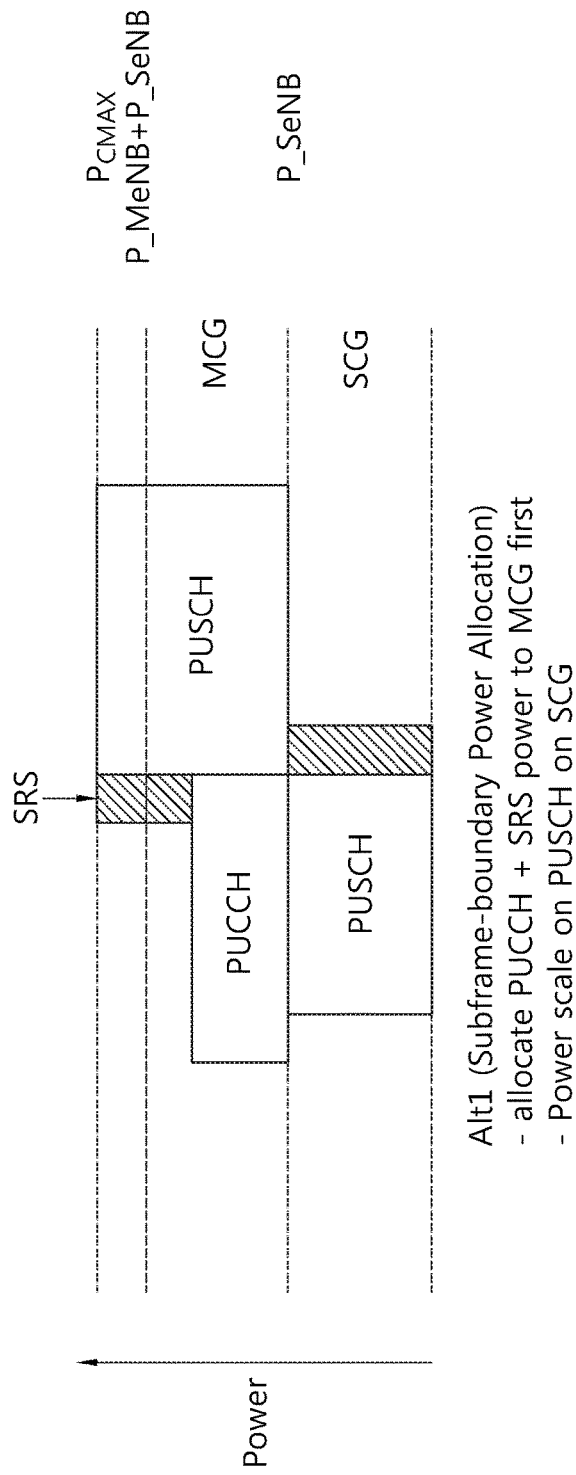
FIG. 9 briefly describes an example of determining power to SRS in PCM2.

① Alternative 1—subframe boundary power allocation: FIG. 9 briefly describes an example of determining power to SRS in PCM2. In the example of FIG. 9, power is allocated at subframe boundary.

Referring to FIG. 9, power allocation is performed at the boundary of subframe. For subframe boundary of MCG, power to PUCCH and SRS on MCG is allocated, and then, power to PUSCH on SCG is allocated. In other word, power allocation may perform in order of (i) allocating power to PUCCH and allocating power on SRS of MCG first, (ii) scaling power for PUSCH of SCG.

That is, power to SCG can be allocated by scaling the allocated power P_SeNB. For power to SRS, SRS of MCG may have propriety to SRS of SeNB.

Figure 10:
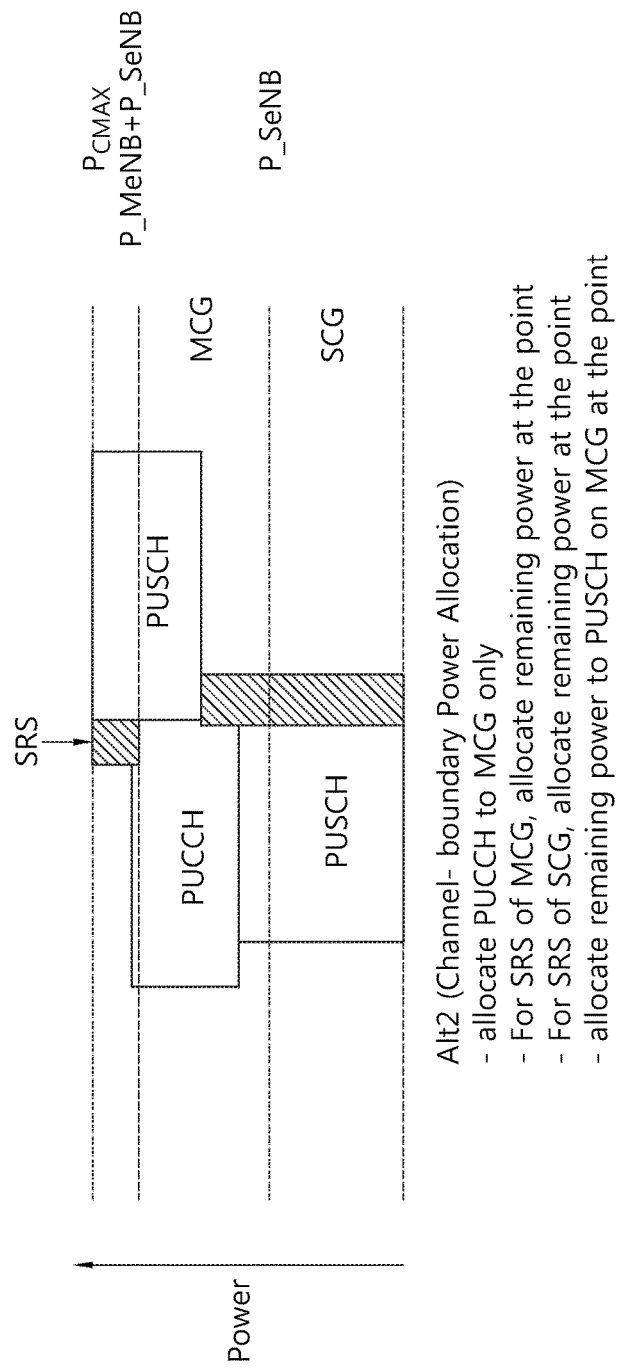
FIG. 10 briefly describes another example of determining power to SRS in PCM2.

② Alternative 2—channel boundary power allocation: FIG. 10 briefly describes another example of determining power to SRS in PCM2. In the example of FIG. 10, power is allocated at channel boundary.

Referring to FIG. 10, power allocation may be performed in order of (i) allocating power to PUCCH of MCG only, (ii) allocating remaining power to SRS of MCG at the point, (iii) allocating remaining power to SRS of SCG, and (iv) allocating remaining power to PUSCH on MCG at the point.

Figure 11:
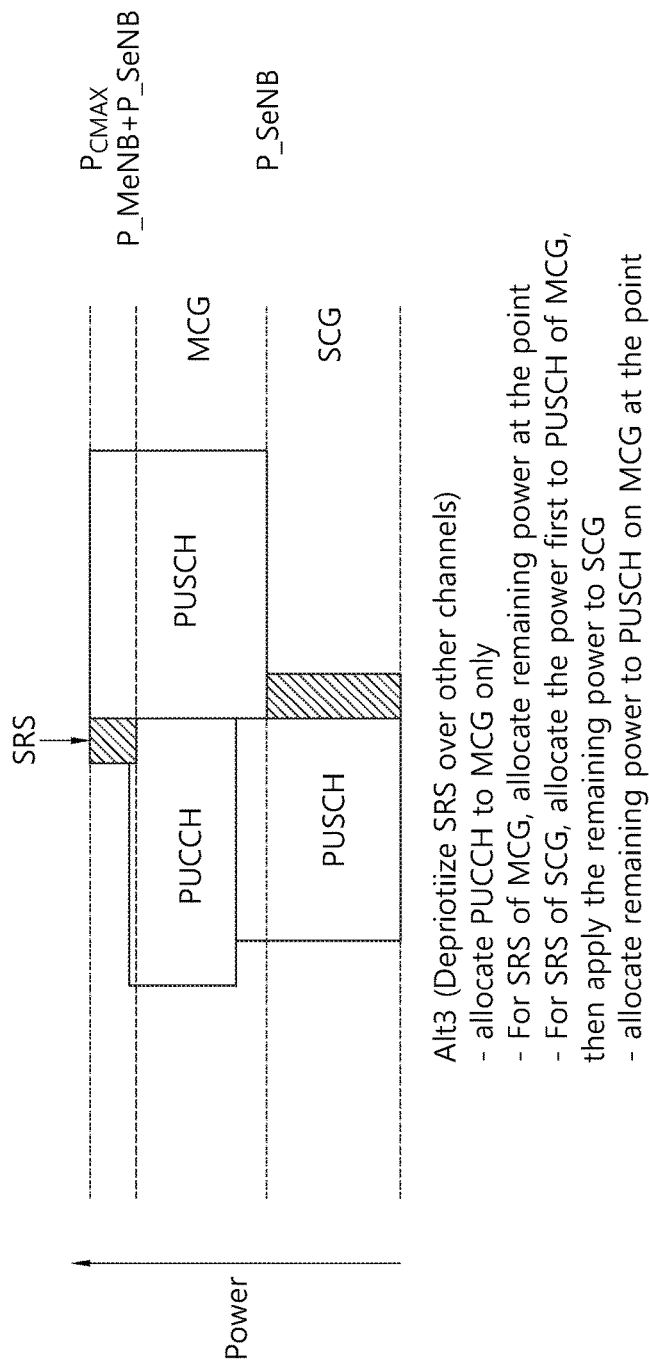
FIG. 11 briefly describes yet another example of determining power to SRS in PCM2.

③ Alternative 3—deprioritizing SRS over other channel: FIG. 11 briefly describes yet another example of determining power to SRS in PCM2. In the example of FIG. 11, power is allocated with SRS deprioritized over other channel.

Referring to FIG. 11, power allocation may be performed in order of (i) allocating power to PUCCH of MCG only, (ii) allocating remaining power to SRS of MCG at the point, (iii) for SRS of SCG, allocating power first to PUSCH of MCG and then applying remaining power to SRS of SCG, and (iv) allocating remaining power to PUSCH on MCG at the point.

Figure 12:
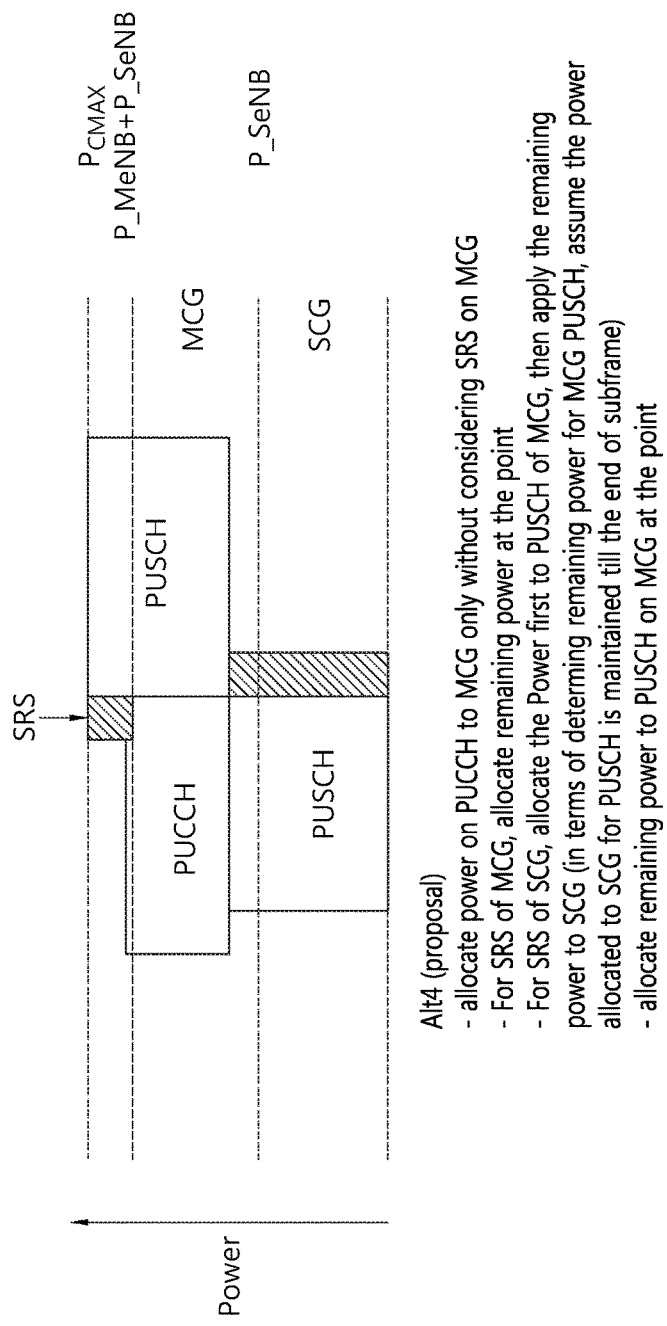
FIG. 12 briefly describes yet another example of determining power to SRS in PCM2.

④ Alternative 4: FIG. 12 briefly describes yet another example of determining power to SRS in PCM2.

Referring to FIG. 12, power allocation may be performed in order of (i) allocating power to PUCCH of MCG only without considering SRS on MCG, (ii) allocating remaining power to SRS of MCG at the point, (iii) for SRS of SCG, allocating power first to PUSCH of MCG and then applying remaining power to SCG, and (iv) allocating remaining power to PUSCH on MCG at the point. In (iii), in terms of determining remaining power for MCG PUSCH, it may be assumed that the power allocated to SCG for PUSCH can be maintained till the end of subframe.

For SRS transmission, after allocating the power, if the allocated power to SRS is larger than $P_{srs}$, which is predetermined maximum SRS transmission power, SRS may be transmitted with $P_{srs}$.

If the allocated power to SRS is lower than $P_{srs}$, three cases (a) to (b) can be considered as below.
(a) If the allocated power to SRS is P_xeNB (allocated power to this eNB), SRS may be transmitted or dropped.
(b) If the allocated power to SRS is greater than P_xeNB, power for SRS may be scaled to P_xeNB or SRS may be dropped.
(c) If the allocated power to SRS is lower than P_xeNB, SRS transmission may be dropped Further, some other alternatives can be considered. For the alternatives, follows may be included.
A) For the power control for DC, dropped SRS within a CG following CA rules is not considered.

In DC PCM2, the following A-a) to A-e) may be applied.
A-a) Power limited case in PCM2 means: a UE is requesting more power than PCmax−PxeNB for the yeNB.
A-b) In terms of allocating remaining power, PUCCH/PUSCH/PRACH is prioritized over SRS.
A-c) If the allocated power to SRS is larger than the requested power for SRS, SRS may be transmitted.
A-d) For the case that the allocated power to SRS>P_SeNB, SRS may be transmitted with allocated power=P_SeNB when allocated power<the requested power, and SRS may be transmitted with allocated power when allocated power=the requested power.
A-e) For power limited case, when SRS of a CG is overlapped with PUCCH/PUSCH/PRACH on the other CG, P_xeNB may be allocated to each SRS In DC PCM1, the following A-f) to A-g) may be applied.
A-f) P_MeNB/P_SeNB is not applicable to SRS.
A-g) In terms of allocating remaining power, PUCCH/PUSCH/PRACH is prioritized over SRS.

In case power-limited, the following A-h) to A-k) may be applied.
A-h) If the transmit power of PUCCH/PUSCH/SRS of a CG is equal to or lower than a guaranteed power configured for the CG, the transmit power may be guaranteed.
A-i) Except when it is overlapped with a PRACH in the other CG, the UE is power-limited.
A-j) Otherwise, for power limited case, when SRS of a CG is overlapped with PUCCH/PUSCH/PRACH on the other CG, SRS may be dropped. Or, for power limited case, when SRS is overlapped with SRS on other CG, SRS is dropped in one CG.

A-k) In DC PCM2, P_SeNB/P_MeNB may be applied towards SRS.

For the case A), the requested power less than P_SeNB (The requested power<P_SeNB). Otherwise, the used power is equal to P_SeNB (used power=P_SeNB), or equal to sum of P_SeNB and delta which are less than requested power (used power=P_SeNB+delta<requested power), or equal to sum of P_SeNB and delta which are equal to requested power (Used power=P_SeNB+delta=requested power).

B) For Power limited cases, three cases may be considered. Case 1: PUCCH+SRS/PUCCH+SRS. Case 2: PUCCH+SRS/SRS. Case 3: SRS/SRS.

C) In a power limited case, the following C-a) to C-c) may be applied.

C-a) P_MeNB or P_SeNB is not applicable towards SRS.

C-b) If SRS of a CG is overlapped with PUCCH/PUSCH/PRACH on the other CG, SRS is dropped.

C-c) If SRS is overlapped with SRS on other CG, SRS is dropped in one CG

D) When DC PC mode 2 is used for PUCCH/PUSCH, UE can look-ahead later transmission on other CG for SRS handling.

D-a) For power limited case, when SRS is overlapped with PUCCH/PUSCH/PRACH on other CG, SRS is dropped.

D-b) For power limited case, when SRS is overlapped with SRS on other CG, SRS is dropped in one CG.

Figure 13:
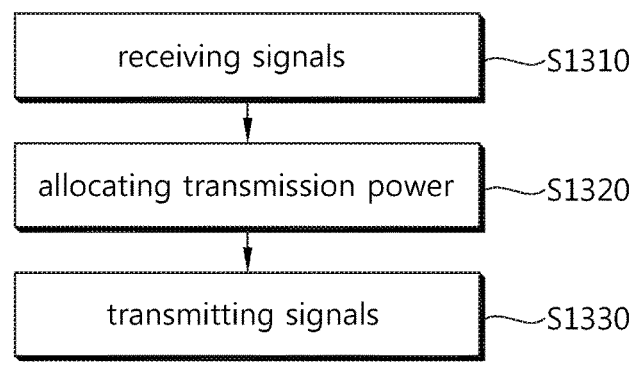
FIG. 13 is a flow chart briefly describing an example of the operation of the UE according to the present invention(s).

FIG. 13 is a flow chart briefly describing an example of the operation of the UE according to the present invention(s). Each operation in FIG. 13 may performed by the UE or a processor in the UE. Following descriptions are provided as the UE performs the operations for describing easily.

First, a UE may receive signals on a downlink channel (S1310). The signals may be transmitted from one or more than one of eNB. For example, the signals may be transmitted from MeNB and/or SeMB under DC circumstance.

The UE may allocate transmission power for uplink channel (S1320). For example, the UE may allocate power to SRS, CSI, PUCCH, PUSCH, etc. In DC circumstance, the UE may allocate power based on a predetermined priority between SRS, CSI, PUCCH, PUSCH as well as MCG and SCG. For example, the UE may allocate transmission power to PUCCH, allocate transmission power to SRS of MeNB and then scales transmission power for SeNB. The UE may allocate transmission power for SRS of MeNB first and then allocate transmission power for SRS of SeNB later.

In addition, the UE may allocate transmission power differently depending on whether the MeNB and the SeNB are synchronous or not. For example, the UE may allocate allocated for SRS at boundary of subframe when the MeNB and SeNB are asynchronous. The UE may also allocate transmission power for SRS of the MeNB with higher priority than SRS of the SeNB when the MeNB and SeNB are synchronous. The UE may also allocate transmission power on SRS with lower priority than transmission power on CSI when the MeNB and the SeNB are synchronous.

The details of power allocation and determination are same as described before.

The UE may transmitting signals with allocated transmission power (S1330). The signals may includes SRS, CSI, etc. The UE may transmit signals to MeNB and/or SeNB which may be configured with dual connectivity.

Figure 14:
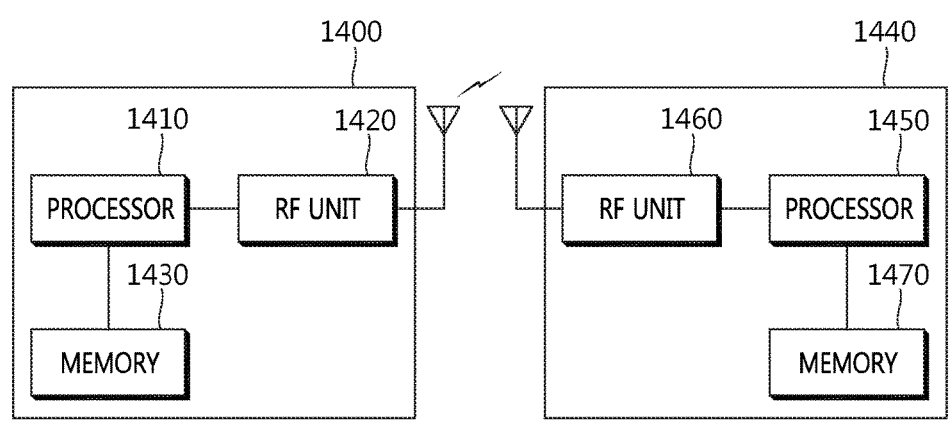
FIG. 14 is a block diagram which briefly describes a wireless communication system including an UE and a BS (eNB).

FIG. 14 is a block diagram which briefly describes a wireless communication system including an UE 1400 and a BS (eNB) 1440. The UE 1400 and the BS 1440 may operate based on the description as explained above.

In view of downlink, a transmitter may be a part of the BS 1440 and a receiver may be a part of the UE 1400. In view of uplink, a transmitter may be a part of the UE 1400 and a receiver may be a part of the BS 1440.

Referring to FIG. 14, the UE 1400 may include a processor 1410, a radio frequency (RF) unit 1420, and a memory 1430.

The processor 1410 may be configured to implement proposed procedures and/or methods described in this application. For example, the processor 1410 operatively coupled to the RF unit 1420 and the memory 1430. The processor 1410 is configured for transmitting/receiving signals via the RF unit 1420 based on a scheduling for UL and/or DL.

For example, the processor 1410 may allocate power to SRS, CSI, PUCCH, PUSCH, etc. In DC circumstance, the processor 1410 may allocate power based on a predetermined priority between SRS, CSI, PUCCH, PUSCH as well as MCG and SCG. For example, the processor 1410 may allocate transmission power to PUCCH, allocate transmission power to SRS of MeNB and then scales transmission power for SeNB. The processor 1410 may allocate transmission power for SRS of MeNB first and then allocate transmission power for SRS of SeNB later. In addition, the processor 1410 may allocate transmission power differently depending on whether the MeNB and the SeNB are synchronous or not. For example, the processor 1410 may allocate allocated for SRS at boundary of subframe when the MeNB and SeNB are asynchronous. The processor 1410 may also allocate transmission power for SRS of the MeNB with higher priority than SRS of the SeNB when the MeNB and the SeNB are synchronous. The processor 1410 may also allocate transmission power on SRS with lower priority than transmission power on CSI when the MeNB and the SeNB are synchronous.

The RF unit 1420 may transmit and receive a radio signal with transmission power allocated by the processor 1410. The RF unit 1420 receives a signal on a downlink channel in dual connectivity with master eNB (MeNB) and secondary eNB (SeNB).

The memory 1430 is coupled with the processor 1410 and stores a variety of information to operate the processor 1410.

The details on the operation of processor 1410, RF unit 1420, memory 1430 are same as describe before.

The BS 1440 may include a processor 1450, a radio frequency (RF) unit 1460, and a memory 1470.

The processor 1450 may be configured to implement proposed procedures and/or methods described in this application. For example, the processor 1450 operatively coupled to the RF unit 1460 and the memory 1470. The processor 1450 is configured for transmitting/receiving signals via the RF unit 1460 based on a scheduling for UL and/or DL.

The processor 1450 may schedule UL and/or DL with received signal such as SRS, CSI, etc. The transmission power for the SRS and/or CSI may have been allocated based on a predetermined priority between SRS, CSI, PUCCH, PUSCH as well as MCG and SCG by the UE 1400. Explains on this was provided before.

The RF unit 1460 may transmit and receive a radio signal, wherein transmission power for the received radio signal was allocated by the UE 1400 as explained. The RF unit 1460 receives a signal on a downlink channel in dual connectivity.

The memory 1470 is coupled with the processor 1450 and stores a variety of information to operate the processor 1450.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps.

Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method of controlling uplink transmission power, by a user equipment, in wireless communication system, the method comprising:
   receiving a signal on a downlink channel in dual connectivity with a master eNB (MeNB) and a secondary eNB (SeNB),
   wherein the signal includes information on transmission power which indicates a power control mode for whether the MeNB and the SeNB are synchronous or asynchronous;
   allocating transmission power for a sounding reference signal (SRS) of the MeNB and a transmission power for a SRS of the SeNB depending on whether the MeNB and the SeNB are synchronous or asynchronous;
   transmitting the SRS of the MeNB to the MeNB based on the allocated transmission power for the SRS of the MeNB; and
   transmitting the SRS of the SeNB to the SeNB based on the allocated transmission power for the SRS of the SeNB,
   wherein when the MeNB and the SeNB are asynchronous, subframe i and subframe i+1 of the MeNB overlap subframe j of the SeNB,
   a portion of a total transmission power at a last symbol of the subframe i is allocated to the transmission power for the SRS of the MeNB,
   a portion of the total transmission power at a symbol immediately following a specific boundary in the subframe j is allocated to the transmission power for the SRS of the SeNB, and
   the specific boundary corresponds to a boundary between the subframe i and the subframe i+1.

2. The method of claim 1, wherein the step of allocating the transmission power for the SRS of the MeNB and the transmission power for the SRS of the SeNB includes:
   allocating a transmission power to a PUCCH of the MeNB;
   allocating the transmission power for the SRS of the MeNB;
   allocating a transmission power to a PUSCH of the SeNB; and
   scaling the transmission power allocated to the PUSCH of the SeNB.

3. The method of claim 1, wherein the transmission power for the SRS of the MeNB is allocated before the transmission power for the SRS of the SeNB is allocated.

4. The method of claim 1, wherein the transmission power for the SRS of the MeNB and the transmission power for the SRS of the SeNB are allocated based on a predetermined priority.

5. The method of claim 1, further comprising:
   allocating a transmission power for a channel of channel state information (CSI) of the SeNB,
   wherein the transmission power for the SRS of the MeNB and the transmission power for the SRS of the SeNB are allocated with a lower priority than the transmission power for the channel of the CSI when the MeNB and the SeNB are synchronous.

6. An apparatus of controlling uplink transmission power, the apparatus comprising:
   a radio frequency (RF) unit for transmitting and receiving a radio signal,
   wherein the radio signal includes information on transmission power which indicates a power control mode for whether a master eNB (MeNB) and a secondary eNB (SeNB) are synchronous or asynchronous; and
   a processor operatively coupled to the RF unit, wherein the processor is configured for transmitting signals via the RF unit based on a scheduling for UL and/or downlink (DL),
   wherein the RF unit receives a signal on a downlink channel in dual connectivity with the MeNB and the SeNB, and
   wherein the processor:
      allocates transmission power for a sounding reference signal (SRS) of the MeNB and a transmission power for a SRS of the SeNB depending on whether the MeNB and the SeNB are synchronous or asynchronous;
      transmits the SRS of the MeNB to the MeNB based on the allocated transmission power for the SRS of the MeNB; and
      transmits the SRS of the SeNB to the SeNB based on the allocated transmission power for the SRS of the SeNB,
   wherein when the MeNB and the SeNB are asynchronous, subframe i and subframe i+1 of the MeNB overlap subframe j of the SeNB,
   a portion of a total transmission power at a last symbol of the subframe i is allocated to the transmission power for the SRS of the MeNB,
   a portion of the total transmission power at a symbol immediately following a specific boundary in the subframe j is allocated to the transmission power for the SRS of the SeNB, and
   the specific boundary corresponds to a boundary between the subframe i and the subframe i+1.

7. The apparatus of claim 6, wherein the processor:
   allocates a transmission power to a PUCCH of the MeNB;
   allocates the transmission power for the SRS of the MeNB;
   allocates a transmission power to a PUSCH of the SeNB; and
   scales the transmission power allocated to the PUSCH of the SeNB.

8. The apparatus of claim 6, wherein the processor allocates the transmission power for the SRS of the MeNB before allocating the transmission power for the SRS of the SeNB.

9. The apparatus of claim 6, wherein the transmission power for the SRS of the MeNB and the transmission power for the SRS of the SeNB are allocated based on a predetermined priority.

10. The apparatus of claim 6,
wherein the processor allocates a transmission power for a channel of channel state information (CSI) of the SeNB, and
wherein the transmission power for the SRS of the MeNB and the transmission power for the SRS of the SeNB are allocated with a lower priority than the transmission power for the channel of the CSI when the MeNB and the SeNB are synchronous.

\* \* \* \* \*